Sept. 27, 1960   J. R. MIDDENTS   2,954,126
VARIABLE DISPLAY PANEL SUPPORT
Filed Dec. 13, 1957   2 Sheets-Sheet 1
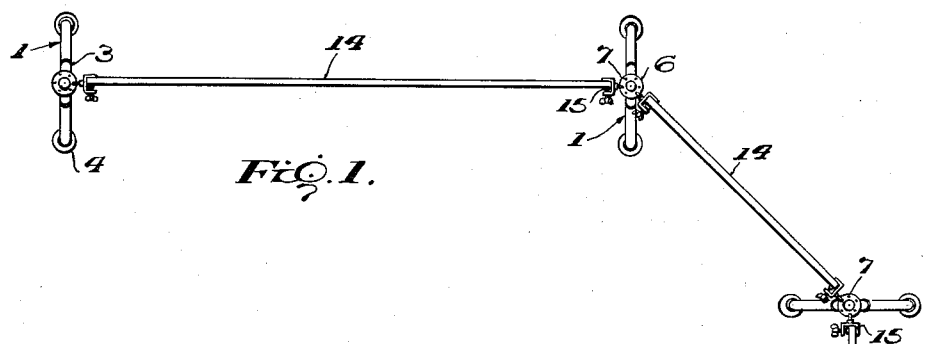
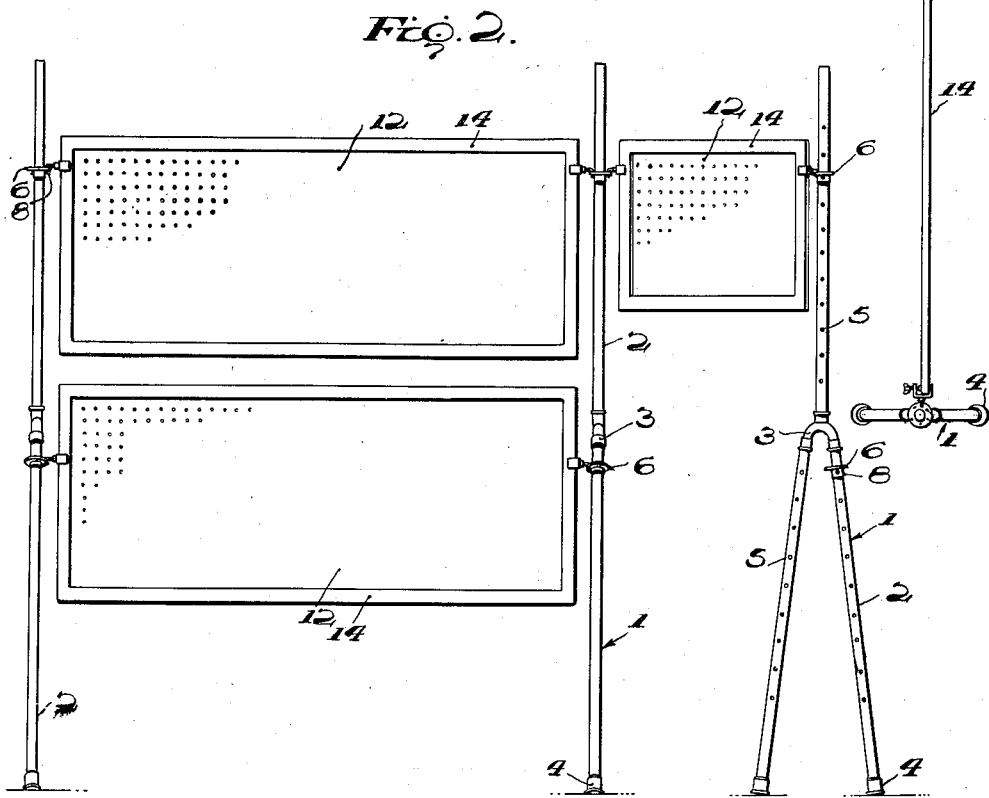
INVENTOR
John R. Middents
BY
ATTORNEY Sept. 27, 1960    J. R. MIDDENTS    2,954,126
VARIABLE DISPLAY PANEL SUPPORT
Filed Dec. 13, 1957    2 Sheets-Sheet 2
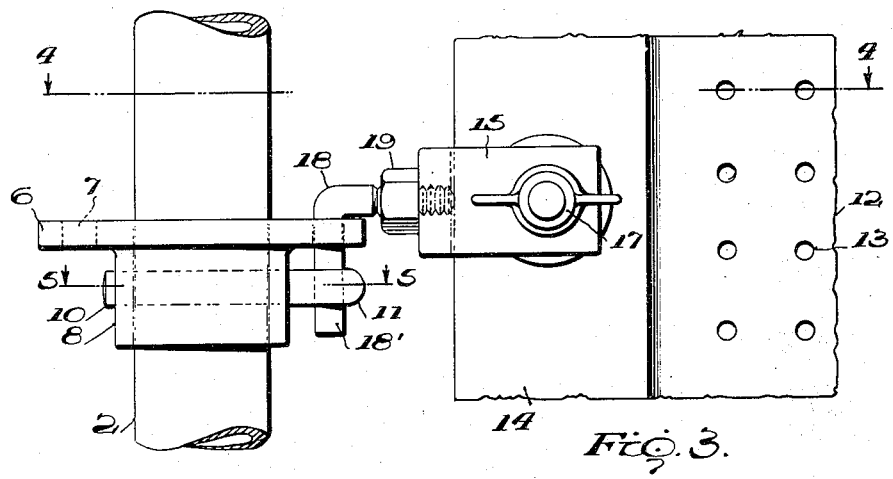
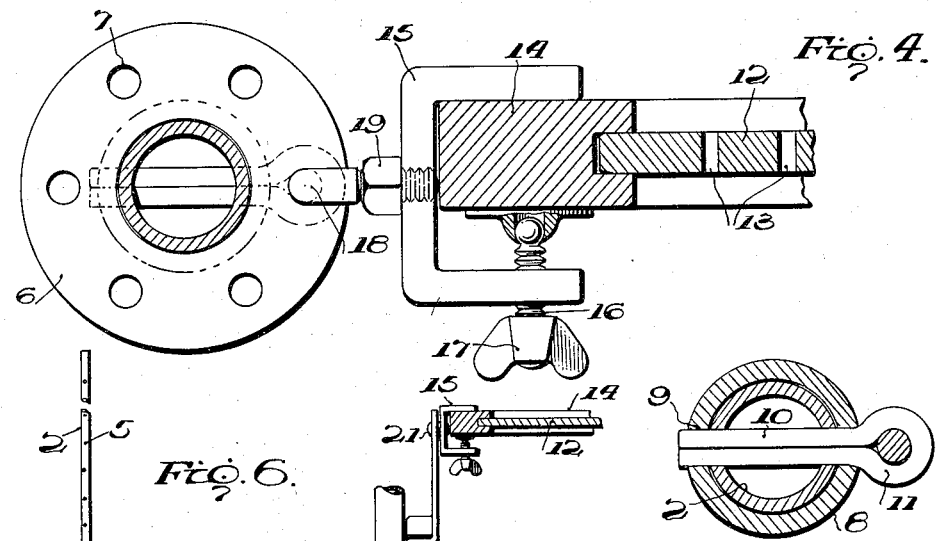
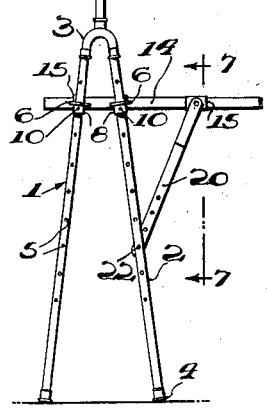
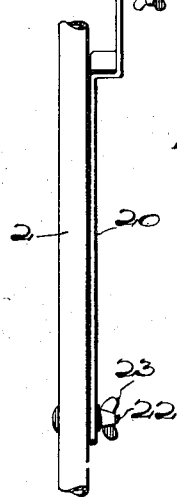
INVENTOR
John R. Middents
BY W. J. Eccleston
ATTORNEY

2,954,126

VARIABLE DISPLAY PANEL SUPPORT

John R. Middents, St. Charles, Mo. (Office Chief of Special Services, APO 245, % P.M., N.Y.)

Filed Dec. 13, 1957, Ser. No. 702,737

3 Claims. (Cl. 211—176)

(Granted under Title 35, U.S. Code (1952), sec. 266)

The invention described herein, if patented, may be manufactured and used by or for the Government for governmental purposes, without the payment to me of any royalty thereon.

This invention relates to display panels and has for its primary object to provide a portable supporting means susceptible of a great variety of arrangements so as to accommodate the panels to innumerable space and lighting conditions.

A further object of the invention consists in the provision of a simplified but sturdy construction of the display means just mentioned, and one which is readily adjustable to varying conditions.

Other objects and advantages of the invention will be apparent from the following description when taken in connection with the accompanying drawings, in which, Figure 1 is a plan view of one arrangement of the panels and supporting means therefor;

Fig. 2 is a front elevational view of such arrangement;

Fig. 3 is an enlarged detailed view showing the connection between a standard and a panel;

Fig. 4 is a horizontal sectional view taken on the line 4—4 of Fig. 3;

Fig. 5 is a horizontal sectional view taken on the line 5—5 of Fig. 3;

Fig. 6 is an elevational view of one of the standards with an additional supporting brace rod associated therewith; and Fig. 7 is an enlarged fragmentary sectional view taken on the line 7—7 of Fig. 6.

Referring to the drawings in greater detail and by reference numeral, the standards or posts employed are indicated generally by the numeral 1, there being four of these standards used in the arrangement shown in Figs. 1 and 2 as illustrative of the variable panel supports. Each of these standards is formed of three pipes or tubes 2, a coupling member 3 in the form of an inverted Y, and the removable feet 4 of rubber or the like. The three arms of the inverted Y are threaded to receive the threaded ends of the several pipe sections 2 so as to form the completed standard, and each of these pipe sections is provided with a series of apertures 5 for cooperation with the supporting means for the panels as will appear hereinafter.

Supporting rings 6 each provided with an annular series of apertures 7 are loosely mounted on the several sections 2 of the standards 1 and those on the leg portions of the standard may be installed before being connected with the inverted coupling 3, or may be slid on from the lower end of the section after first removing the detachable feet 4. Each of these supporting rings is provided with a depending collar 8 which loosely engages its pipe section 2 and is apertured as indicated by the numeral 9 (Fig. 5) for the reception of a cotter pin or the like 10, such cotter pin being provided with the usual looped head portion 11. It will be apparent therefore that any number of these supporting rings 6 may be installed on the three sections of each standard 1 in accordance with the number of apertures.

The panels which are employed for supporting the items to be displayed are indicated generally by the numeral 12, provided with uniformly spaced apertures 13, and a frame portion 14. The means for coupling the panels to the standards may be attached to the vertical edges of the frame and preferably include U-clamp 15 and its clamping bolt 16 and wing nut 17 as clearly indicated in Figs. 3 and 4. Threaded to the base of the U-clamp 15 is an L-shaped hook 18 and a lock nut 19 provides the means for fixedly securing the hook 18 in any angular position with respect to the plane of the panel 12. The free end of the hook 18 is indicated by the numeral 18′ and is adapted to be inserted in any one of the annular series of apertures 7 in the supporting rings 6 with which it is to be associated, and it will be noted that the free end 18′ may also be extended through the looped head 11 of the cotter pin 10, thereby securing the latter in its operative association with the collar 8 of the supporting means.

In Figs. 6 and 7, there is shown the brace rod 20 which may be employed in supporting a panel in horizontal or near horizontal position. In this arrangement, the panel 12 may be connected to one or more of the pipe sections 2 as shown in Fig. 6, and the upper end of the brace rod 20 may be connected to one of the clamps 15 by means of a bolt 21 as indicated in Fig. 7, the opposite end of the brace rod being secured to the adjacent pipe section 2 by a bolt 22 and a wing 23.

From the foregoing description taken in connection with the attached drawings, it will be seen that I have devised a series of standards which may be arranged in any one of a varied number of positions and the panels 12 mounted thereon in a variety of angular positions deemed best suitable to the lighting arrangement of the particular locality and the available space. It should also be mentioned that the variable support disclosed herein may be employed as adaptable scaffolding and temporary support for a great variety of purposes.

In accordance with the patent statutes, I have described what I now consider to be the preferred form of the invention, but since various minor changes may be made in structural details without departing from the spirit of the invention, it is intended that all such changes be included within the scope of the appended claims.

I claim:

1. A display device comprising a plurality of standards each provided with series of vertically spaced apertures, supporting rings mounted on the standards each provided with an aperture, a collar depending from each ring apertured to receive a cotter pin, cotter pins passing through the apertures of the collars and selected apertures in the standards, each cotter pin provided with an aperture in its head, a display panel, and hooks on the vertical edges of the display panel for engaging the apertures in the supporting rings and in the cotter pins.

2. A display device comprising a plurality of standards each provided with series of vertically spaced apertures, supporting rings loosely mounted on the standards each provided with an annular series of apertures, means engaging the apertures in the standards for supporting said rings in various adjusted positions, display panels, and means on the vertical edges of the panels for engaging selected apertures in the annular series of apertures for supporting the panels in various angular relationships.

3. A display device comprising a least three standards, supporting rings slidably mounted on said standards, means for securing the supporting rings in various adjusted positions vertically of the standards, each supporting ring provided with an annular series of apertures, a plurality of display panels, and means on the vertical edges of the display panels for engaging selected apertures in the annular series of apertures for supporting the panels in various angular relationships.

References Cited in the file of this patent

UNITED STATES PATENTS

| | | |
|---|---|---|
| 509,366 | Drum | Nov. 28, 1893 |
| 557,501 | Ennis | Mar. 31, 1896 |
| 1,172,355 | Guest | Feb. 22, 1916 |
| 1,264,228 | Uhl | Apr. 30, 1918 |
| 1,450,084 | Hull | Mar. 27, 1923 |
| 1,554,137 | Slifkin | Sept. 15, 1925 |
| 1,758,976 | Rice | May 20, 1930 |
| 1,866,530 | Funk | July 12, 1932 |
| 2,553,980 | Ostrander | May 22, 1951 |
| 2,559,106 | Bishop | July 3, 1951 |

FOREIGN PATENTS

| | | |
|---|---|---|
| 123,103 | Germany | Aug. 16, 1901 |
| 161,468 | Great Britain | Apr. 14, 1921 |
| 887,105 | Germany | Aug. 20, 1953 |